(12) United States Patent
Yamamoto

(10) Patent No.: US 12,560,173 B2
(45) Date of Patent: Feb. 24, 2026

(54) MOTOR AND APPARATUS USING THE SAME

(71) Applicant: Canon Kabushiki Kaisha, Tokyo (JP)

(72) Inventor: Takeshi Yamamoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/058,370

(22) Filed: Nov. 23, 2022

(65) Prior Publication Data

US 2023/0095855 A1 Mar. 30, 2023

Related U.S. Application Data

(63) Continuation of application No. PCT/JP2021/019677, filed on May 24, 2021.

(30) Foreign Application Priority Data

Jun. 1, 2020 (JP) ................................. 2020-095777

(51) Int. Cl.
*F04D 25/06* (2006.01)
*F04D 13/06* (2006.01)
*H02K 21/24* (2006.01)

(52) U.S. Cl.
CPC ......... *F04D 25/06* (2013.01); *F04D 13/0666* (2013.01); *H02K 21/24* (2013.01)

(58) Field of Classification Search
CPC .... F04D 25/06; F04D 25/063; F04D 13/0666; H02K 21/022–029
USPC .......................................... 310/90.5, 156.32
See application file for complete search history.

(56) References Cited

U.S. PATENT DOCUMENTS

| | | | | |
|---|---|---|---|---|
| 4,605,874 | A | * | 8/1986 | Whiteley ............... H02K 23/54 |
| | | | | 310/156.32 |
| 6,611,073 | B2 | | 8/2003 | Kanebako et al. |
| 2019/0245405 | A1 | * | 8/2019 | Moore ................... H02K 1/165 |

(Continued)

FOREIGN PATENT DOCUMENTS

| | | | | |
|---|---|---|---|---|
| DE | 102013201692 | A1 | * | 8/2014 ............... F04D 1/04 |
| JP | H08322194 | A | | 12/1996 |
| JP | 2002247823 | A | | 8/2002 |

(Continued)

OTHER PUBLICATIONS

International Search Report and Written Opinion issued Jul. 6, 2021 in corresponding International Application No. PCT/JP2021/019677.

(Continued)

*Primary Examiner* — Philip E Stimpert
(74) *Attorney, Agent, or Firm* — Venable LLP

(57) ABSTRACT

A motor includes: a first portion that includes a plurality of permanent magnets; and a second portion that includes a plurality of coils, wherein the first portion or the second portion is configured to be rotatable around a rotation axis, wherein the plurality of permanent magnets are circumferentially arranged about the rotation axis, and wherein the plurality of coils are arranged so as to face the plurality of permanent magnets in a direction along the rotation axis, and the motor further includes: a control unit that controls a rotational speed and an attitude of the rotating first portion or the rotating second portion by controlling currents that are applied to the plurality of coils.

20 Claims, 7 Drawing Sheets

(56) References Cited

U.S. PATENT DOCUMENTS

2023/0035514 A1    2/2023   Yamamoto

FOREIGN PATENT DOCUMENTS

| | | | | |
|---|---|---|---|---|
| JP | 2005016677 | A | | 1/2005 |
| JP | 2010279230 | A | | 12/2010 |
| JP | 2014033543 | A | * | 2/2014 |
| WO | WO-2016158185 | A1 | * | 10/2016 .............. A61M 1/10 |

OTHER PUBLICATIONS

International Preliminary Report on Patentability issued Dec. 15, 2022 in corresponding International Application No. PCT/JP2021/019677.
Japanese Office Action issued Sep. 3, 2024 in counterpart Japanese Patent Appln. No. 2020-095777.
Japanese Office Action dated Apr. 16, 2024 in counterpart Japanese Patent Appln. No. 2020-095777.

* cited by examiner

θ=0deg

MOTOR AND APPARATUS USING THE SAME

CROSS-REFERENCE TO RELATED APPLICATIONS

This application is a Continuation of International Patent Application No. PCT/JP2021/019677, filed May 24, 2021, which claims the benefit of Japanese Patent Application No. 2020-095777, filed Jun. 1, 2020, both of which are hereby incorporated by reference herein in their entirety.

BACKGROUND OF THE INVENTION

Field of the Invention

The present invention relates to a motor and an apparatus using the same.

Description of the Related Art

Japanese Patent Application Laid-Open No. 2005-016677 describes an axial type magnetically floating rotary apparatus for rotating a rotor in a non-contact state around an axis while axially and magnetically floating the rotor along the axial direction thereof, and an axial type magnetically floating centrifugal pump using the same. Japanese Patent Application Laid-Open No. H08-322194 also describes an axial type magnetically floating rotary motor and a rotary apparatus using the motor. Japanese Patent Application Laid-Open No. 2005-016677 and Japanese Patent Application Laid-Open No. H08-322194 describe, as application examples of the rotary apparatus, a high speed rotating machine, a high speed spindle for a machine tool, an artificial heart, a centrifugal pump, and a vacuum pump.

However, in the rotary apparatus described in Japanese Patent Application Laid-Open No. 2005-016677, while the rotation control is performed by a lower stator arranged below the rotor, the attitude of the rotor is maintained by an upper stator arranged above the rotor, so that it is difficult to avoid the enlargement and complexity of the entire apparatus.

In addition, in the motor described in Japanese Patent Application Laid-Open No. H08-322194, a stator arranged on the upper portion of the motor is provided with a winding which is used for both of rotation and floating of the rotor, but only the position of the rotor in the axial direction is controlled, and other inclination components are not controlled. Therefore, there is a possibility that the motor described in Japanese Patent Application Laid-Open No. H08-322194 is unstable in rotation.

An object of the present invention is to provide a motor capable of more stably rotating a mover without contact by a simpler structure, and an apparatus using the motor.

SUMMARY OF THE INVENTION

A motor according to one aspect of the present invention includes: a first portion that includes a plurality of permanent magnets; and a second portion that includes a plurality of coils, wherein the first portion or the second portion is configured to be rotatable around a rotation axis, wherein the plurality of permanent magnets are circumferentially arranged about the rotation axis, and wherein the plurality of coils are arranged so as to face the plurality of permanent magnets in a direction along the rotation axis, and the motor further includes: a control unit that controls a rotational speed and an attitude of the rotating first portion or the rotating second portion by controlling currents that are applied to the plurality of coils.

Further features of the present invention will become apparent from the following description of exemplary embodiments with reference to the attached drawings.

BRIEF DESCRIPTION OF THE DRAWINGS

FIG. 6 is a schematic diagram illustrating a rotary apparatus according to a second embodiment of the present invention.

DESCRIPTION OF THE EMBODIMENTS

First Embodiment

Hereinafter, a first embodiment of the present invention will be described with reference to FIG. 1A to FIG. 5B.

Figure 1A:
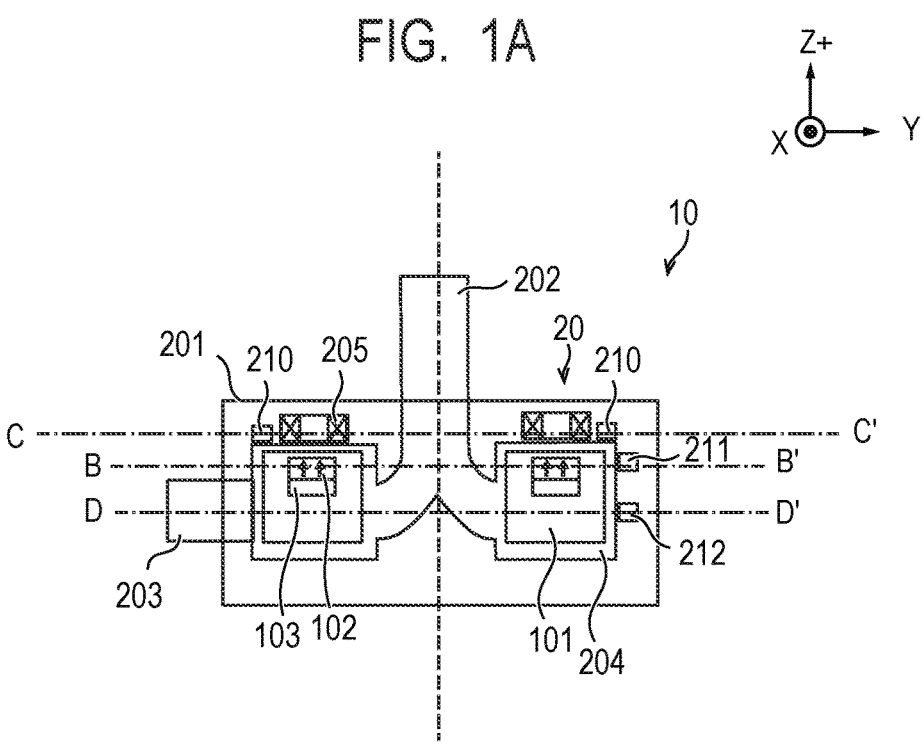
FIG. 1A is a schematic diagram illustrating a rotary apparatus according to a first embodiment of the present invention.
Figure 1B:
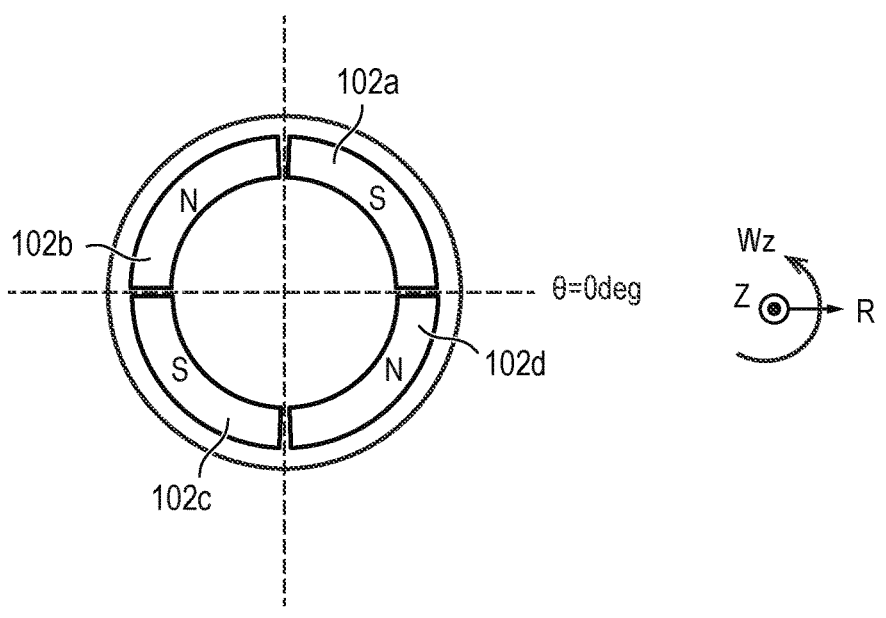
FIG. 1B is a schematic diagram illustrating the rotary apparatus according to the first embodiment of the present invention.
Figure 1C:
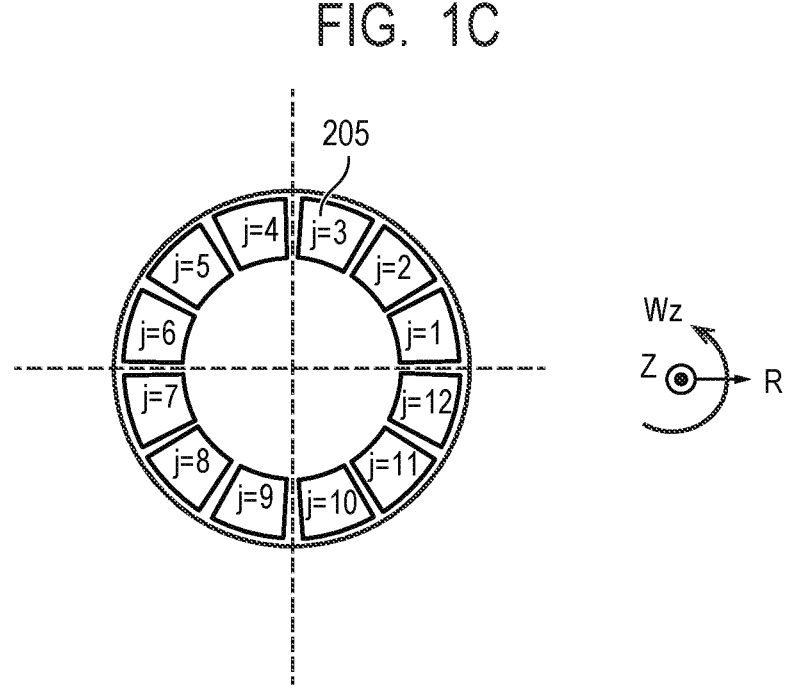
FIG. 1C is a schematic diagram illustrating the rotary apparatus according to the first embodiment of the present invention.
Figure 1D:
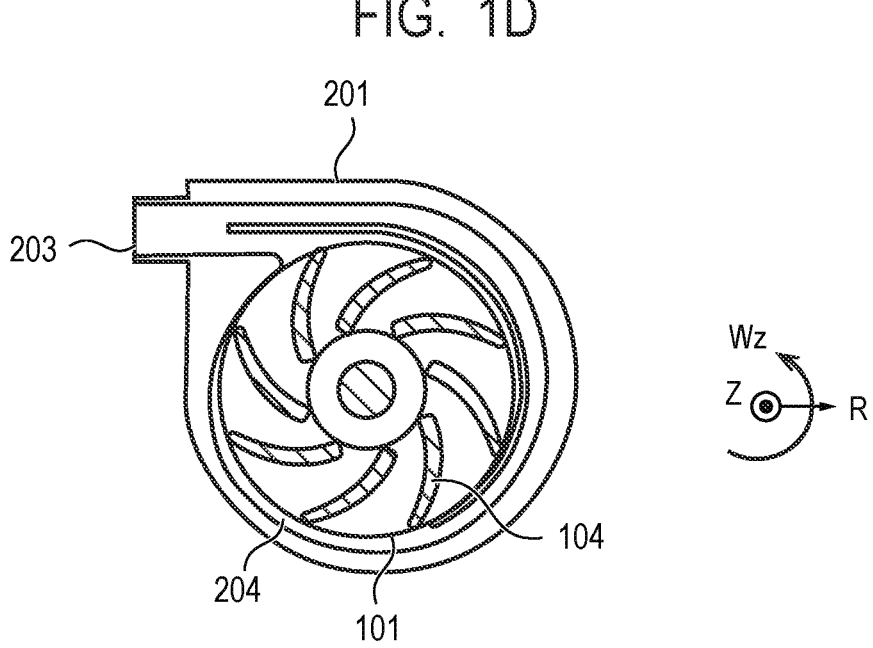
FIG. 1D is a schematic diagram illustrating the rotary apparatus according to the first embodiment of the present invention.
Figure 1E:
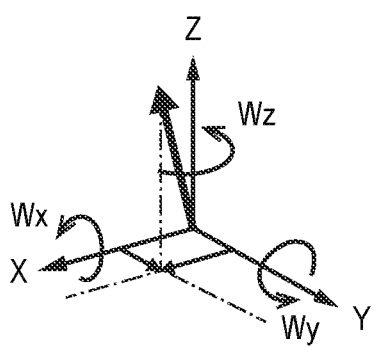
FIG. 1E is a schematic diagram illustrating coordinate axes and directions that are used for describing the rotary apparatus according to the first embodiment of the present invention.

First, an overall configuration of a rotary apparatus including a motor according to the embodiment will be described with reference to FIG. 1A to FIG. 1E. FIG. 1A is a longitudinal sectional view along a rotation axis illustrating the rotary apparatus according to the present embodiment. FIG. 1B is a cross-sectional view along a line B-B' of FIG. 1A. FIG. 1C is a cross-sectional view along a line C-C' of FIG. 1A. FIG. 1D is a cross-sectional view along a D-D' line of FIG. 1A. FIG. 1E is a schematic diagram illustrating coordinate axes and directions used in the following description of the rotary apparatus.

Here, coordinate axes and directions used in the following description are defined. First, a Z-axis is taken as an axis along a rotation axis around which a mover 101 described later rotates. An XY plane is taken so as to be perpendicular to the Z-axis, and an X-axis and a Y-axis are taken so as to be perpendicular to each other in the XY plane. The direction along the X-axis is defined as an X direction, the direction along the Y-axis is defined as a Y direction, and the direction along the Z-axis is defined as a Z direction. Furthermore, the rotation direction around the X-axis is defined as a Wx direction, the rotation direction around the Y-axis is defined as a Wy direction, and the rotation direction around the Z-axis is defined as a Wz direction. The positive direction of each rotation in the Wx direction, the Wy direction and the Wz direction is the direction of the right screw relative to the positive direction of each axis in which each of the X-axis, the Y-axis and the X-axis extends. FIG. 1E illustrates the respective axes and the respective directions. An R axis is taken in a direction in which the radius increases with the Z-axis as the central axis.

As illustrated in FIG. 1A, a pump 10 according to the present embodiment includes a motor 20 having a mover 101 that is a first portion and a stator 201 that is a second portion. The motor 20 is an axial magnetically floating motor. In the present embodiment, as an example of the rotary apparatus in which the motor 20 is used, the pump 10 in which fins 104 (see FIG. 1C) are attached to the mover 101 will be described. The fin 104 is a rotary member that rotates together with the mover 101.

The stator 201 is configured as a housing having an intake port 202, a discharge port 203, and a pump chamber 204. The pump chamber 204 is formed in an annular shape with the Z-axis as a center axis. The annular mover 101 is rotatably accommodated in the pump chamber 204. The intake port 202 is disposed so as to be centered with respect to the pump chamber 204 and is connected to the inner periphery of the pump chamber 204. The discharge port 203 is connected to the outer periphery of the pump chamber 204.

The stator 201 includes a plurality of coils 205 arranged so as to face the mover 101 accommodated in the pump chamber 204. The plurality of coils 205 are annularly arranged so as to face the upper surface of the annular mover 101 in the Z direction.

On the other hand, the mover 101 is configured as an annular impeller accommodated in the pump chamber 204. The mover 101 includes a plurality of permanent magnets 102, a yoke plate 103, and a plurality of fins 104. The plurality of permanent magnets 102 are mounted on the annular yoke plate 103 so as to face the upper surface of the mover 101 at the upper portion of the mover 101. The mover 101 rotates in the pump chamber 204 of the stator 201 with the Z-axis as a rotation axis.

In the pump 10, as described later, the mover 101 accommodated in the pump chamber 204 rotates in a predetermined direction using an axis along the Z-axis as a rotation axis while floating in the Z direction by force acting between the coils 205 to which a current is applied and the permanent magnets 102. Note that the Z direction in which the mover 101 floats is, for example, a vertical direction, but may be a direction other than the vertical direction. When the mover 101 rotates, fluid flows into the pump chamber 204 from the intake port 202, and the fluid that has flowed is discharged from the discharge port 203. In this manner, the pump 10 operates to take in the fluid from the intake port 202 and to discharge and transfer the taken fluid from the discharge port 203. Note that the pump 10 is configured to transfer a liquid as the fluid, for example, but may also be configured to transfer a gas as the fluid.

The pump 10 has attitude sensors 210, a Wz rotation angle sensor 211, and XY sensors 212. The attitude sensors 210, the Wz rotation angle sensor 211, and the XY sensors 212 are attached to and installed in the stator 201.

The attitude sensors 210 are attached to three or more positions of the stator 201 so as to face the mover 101 in the Z direction. Each attitude sensor 210 can detect and output a distance in the Z direction to the mover 101. The attitude (Z, Wx and Wy) of the mover 101 can be calculated from the outputs of the plurality of attitude sensors 210 installed at three or more positions. Here, in the attitude of the mover 101, Z is a position of the mover 101 in the Z direction, Wx is a rotation angle of the mover 101 in the Wx direction, and Wy is a rotation angle of the mover 101 in the Wy direction (see FIG. 1E).

The Wz rotation angle sensor 211 is attached to the stator 201 so as to face the outer peripheral surface, the upper surface or the lower surface of the mover 101. The Wz rotation angle sensor 211 can detect and output the rotation angle of the mover 101 in the Wz direction. A scale (not illustrated) is attached to the surface of the mover 101 facing the Wz rotation angle sensor 211. The Wz rotation angle sensor 211 can detect the rotation angle of the mover 101 in the Wz direction by reading a pattern on the scale of the mover 101.

The XY sensors 212 are attached to two positions of the stator 201 so as to face the mover 101 in the X direction and the Y direction. The XY sensors 212 attached to the two positions can detect and output distances between the mover 101 and the XY sensors 212 in the X direction and the Y direction, respectively.

In the mover 101, the plurality of permanent magnets 102 are circumferentially arranged about the rotation axis of the mover 101. Specifically, as illustrated in FIG. 1B, four permanent magnets 102*a*, 102*b*, 102*c*, and 102*d* are circumferentially attached to the upper portion of the mover 101 so as to be arranged in the Wz direction as the plurality of permanent magnets 102 in a plane along the XY plane. However, note that the number of the plurality of permanent magnets 102 is not limited to four, and can be appropriately changed. The four permanent magnets 102*a*, 102*b*, 102*c*, and 102*d* are magnetized and attached so that N poles and S poles are alternately aligned in the Wz direction while the polarities of the magnetic poles facing upward on the coil 205 side of the stator 201 are alternately different in a plane along the XY plane. The permanent magnets 102*a*, 102*b*, 102*c*, and 102*d* are magnetized so that an N pole, an S pole, an N pole, and an S pole face the coil 205 side in this order.

Note that, in the following description, "a", "b", "c" and "d" are used as indicators for distinguishing the four permanent magnets 102, and the four permanent magnets 102 are distinguished by being appropriately labeled as the permanent magnet 102*a*, the permanent magnet 102*b*, the permanent magnet 102*c* or the permanent magnet 102*d*.

As illustrated in FIG. 1C, twelve coils 205 are attached to and installed in the stator 201 so as to be arranged in the Wz direction as the plurality of coils 205 facing the permanent magnets 102 of the mover 101 in the Z direction in a plane along the XY plane. However, note that the number of the plurality of coils 205 is not limited to twelve, and can be appropriately changed. The coil 205 is a cored coil or an air core coil constituted by winding a conductor wire around an iron core or an air core. Note that all of the plurality of coils 205 may be cored coils or air core coils, or a portion of the plurality of coils 205 may be cored coils and the remainder may be air core coils.

In the stator 201, it is preferable that the plurality of coils 205 are arranged so that at least three coils of the plurality of coils 205 face each of the plurality of permanent magnets 102 of the mover 101. With at least three coils 205 facing each of the permanent magnets 102, the rotational speed and attitude of the mover 101 can be controlled with high accuracy by the force acting between the permanent magnet 102 and the coil 205.

Note that, in the following description, the symbol "j" (j is an integer satisfying 1≤j≤12) is used as an index for distinguishing the twelve coils 205, and the twelve coils 205 are distinguished by denoting them as coil 205-*j* as appropriate.

Note also that, in the following description, the reference of the rotational coordinate in the Wz direction in the mover 101 is defined as the boundary between the permanent magnet 102*a* and the permanent magnet 102*d*. The reference of the rotational coordinate in the Wz direction in the stator 201 is defined as the boundary between the coil 205-1 and the coil 205-12. The magnitude of the rotation angle of the mover 101 in the Wz direction is defined as θ.

As illustrated in FIG. 1D, the mover 101 is provided with the plurality of fins 104 on a surface along the XY plane. The plurality of fins 104 are provided in a spiral shape curved while being inclined at a predetermined angle with respect to the radial direction of the annular mover 101, for example. The plurality of fins 104 rotate integrally with the mover 101 to push the fluid taken into the pump chamber 204 from the intake port 202 toward the discharge port 203. Note that the shape of each of the plurality of fins 104 can be appropriately changed according to the type of the pump 10.

Figure 2:
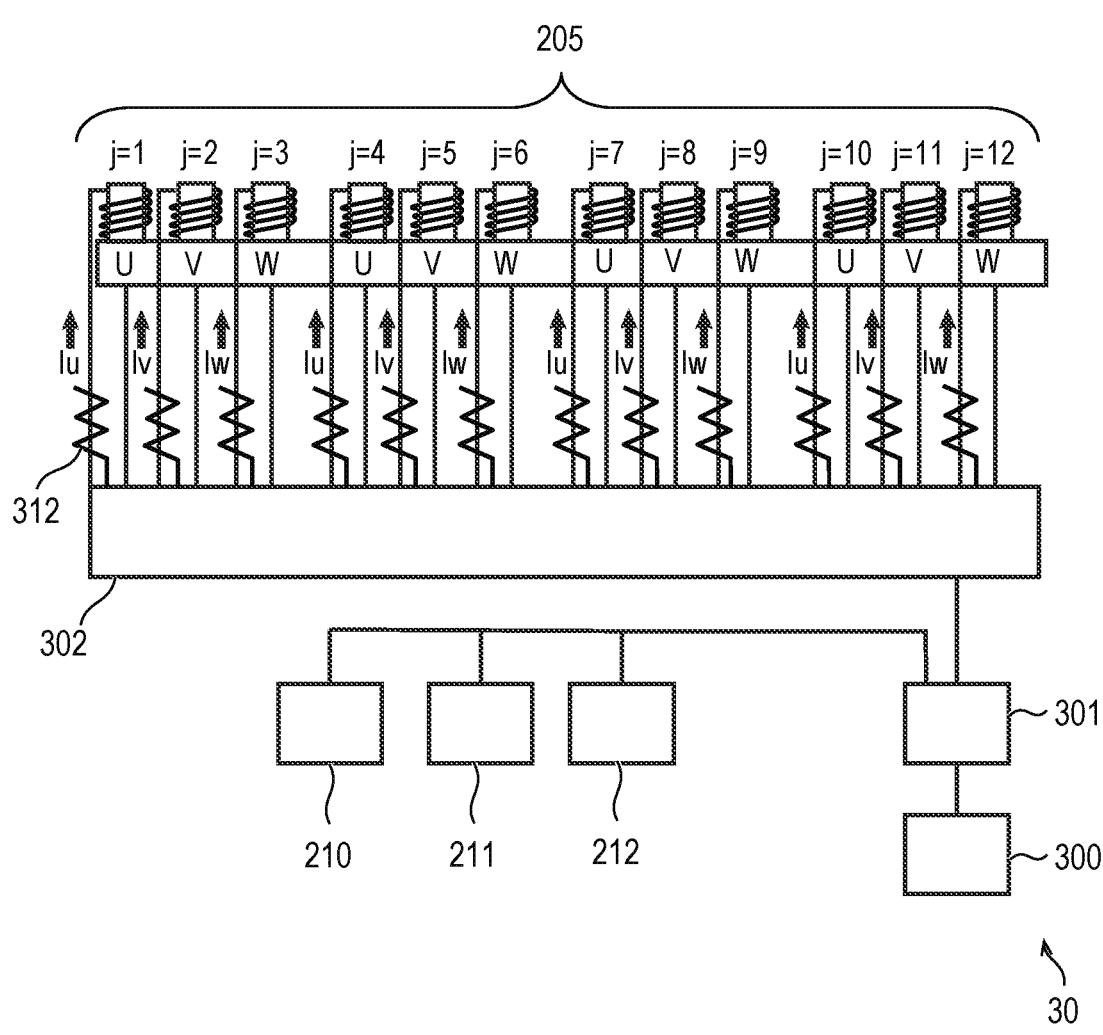
FIG. 2 is a schematic diagram illustrating a control unit of the rotary apparatus according to the first embodiment of the present invention.

The pump 10 is provided with a control unit 30 that controls the pump 10. The control unit 30 controls, for example, the attitude of the mover 101, the rotational speed of the mover 101, and the like. The control unit 30 will be further described with reference to FIG. 2. FIG. 2 is a schematic diagram illustrating the control unit 30 of the pump 10. Note that the control unit 30 may form a part of the pump 10.

As illustrated in FIG. 2, the control unit 30 includes an integration controller 300, an attitude controller 301, and a coil controller 302. The integration controller 300, the attitude controller 301, and the coil controller 302 execute the respective processes by executing control programs corresponding to the respective processes to execute various calculations. Note that all or part of the control unit 30 may be provided separately from the mover 101 and the stator 201, or may be provided on or in the stator 201.

The attitude controller 301 is connected to the integration controller 300 in a communicable manner. The coil controller 302 is connected to the attitude controller 301 in a communicable manner. The attitude sensors 210, the Wz rotation angle sensor 211, and the XY sensors 212 are connected to the attitude controller 301. The twelve coils 205 installed on the stator 201 as described above are connected to the coil controller 302. In the twelve coils 205, a coil unit including three coils 205 functioning as a U-phase coil, a V-phase coil and a W-phase coil is constituted for every three coils arranged in order in the Wz direction. Each of the twelve coils 205 is provided with a current sensor 312 that detects and outputs a current applied to the coil 205. Each current sensor 312 is connected to the coil controller 302.

The integration controller 300 controls the mover 101 by instructing a target value of the attitude of the mover 101 to the attitude controller 301.

The attitude controller 301 calculates a torque vector that indicates a torque to be applied to the mover 101 based on the target value of the attitude from the integration controller 300 and the outputs of the attitude sensors 210, the Wz rotation angle sensor 211 and the XY sensors 212. The attitude controller 301 can detect the rotation angle and attitude of the mover 101 based on the outputs of the attitude sensors 210, the Wz rotation angle sensor 211 and the XY sensors 212.

The coil controller 302 calculates a current to be applied to each coil 205 based on the torque vector calculated by the attitude controller 301. The coil controller 302 controls and applies a current to each coil 205 according to the current the coil controller 302 has calculated. The coil controller 302 can detect the current value of each coil 205 based on the output of each current sensor 312. A current control device (not illustrated) is connected to each coil 205. The coil controller 302 can independently control the current value of each coil 205 by controlling each current control device according to the detected current value of each coil 205.

Figure 3:
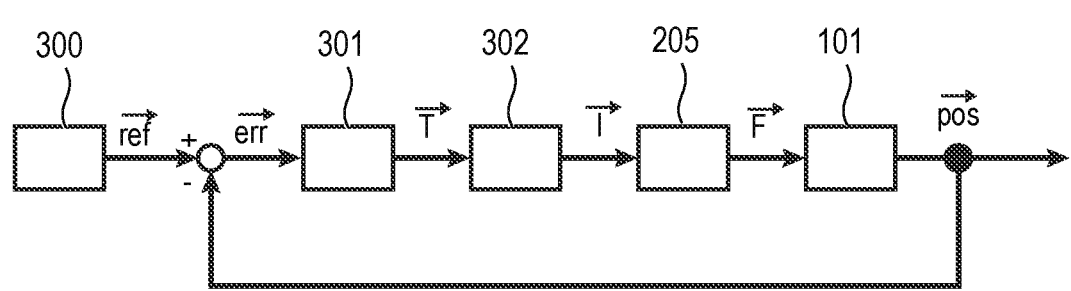
FIG. 3 is a schematic diagram illustrating a method of controlling the attitude of a mover in the rotary apparatus according to the first embodiment of the present invention.

Next, a method of controlling the attitude of the mover 101 by the control unit 30 will be described with reference to FIG. 3. FIG. 3 is a schematic diagram that explains the method of controlling the attitude of the mover 101 in the pump 10, and schematically illustrates a control loop for calculating the magnitude of force applied to the mover 101. In FIG. 3, ref is a target value of the attitude of the mover 101 instructed to the attitude controller 301 from the integration controller 300, and pos is attitude information of the mover 101 obtained from the sensor group. The sensor group includes the attitude sensors 210, the Wz rotation angle sensor 211, and the XY sensors 212.

As illustrated in FIG. 3, the attitude controller 301 calculates a torque vector T that indicates the torque to be applied to the mover 101 from the difference err between the target value ref of the attitude and the current attitude information pos. The attitude controller 301 may be, for example, a controller based on PID control or a controller that uses a filter as appropriate according to the characteristics of the mover 101. Such a controller can stabilize the attitude of the mover 101.

The coil controller 302 calculates a current vector I that indicates current to be applied to each coil 205 based on the torque vector T calculated by the attitude controller 301. The coil controller 302 applies the current corresponding to the current vector I the coil controller 302 has calculated to each coil 205.

When the current is applied to each coil 205 in this manner, it acts as force F on the mover 101 to rotate the mover 101. The sensor group of the attitude sensors 210, the Wz rotation angle sensor 211 and the XY sensors 212 detects the attitude of the rotating mover 101 and acquires the attitude information pos.

Here, the torque vector T that indicates the torque applied to the mover 101 is represented by the following Equation (1). Tx, Ty, and Tz are the three-axis components of the force, and are the X-direction component, the Y-direction component, and the Z-direction component of the force, respectively. Twx, Twy and Twz are the three-axis components of the moment, and are the around-X-axis component, the around-Y-axis component and the around-Z-axis component of the moment, respectively.

$$T=(Tx,Ty,Tz,Twx,Twy,Twz) \qquad \text{Equation (1)}$$

By controlling the six-axis components (Tx, Ty, Tz, Twx, Twy, Twz) of the torque vector T, the control unit 30 controls the rotation of the mover 101 while controlling the attitude of the mover 101 in the six axes. As a result, in the pump 10 according to the present embodiment, the mover 101 can be floated and stably rotated without contact with the stator 201.

Figure 4:
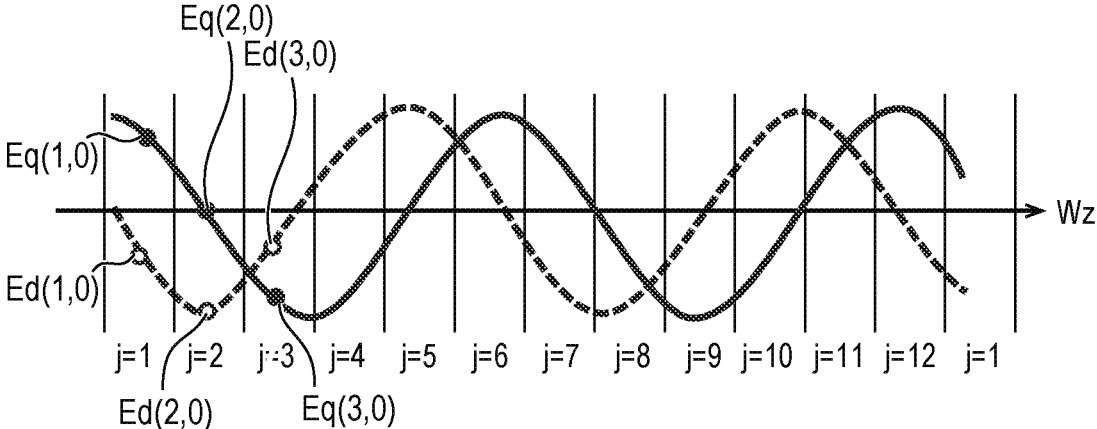
FIG. 4 is a graph schematically illustrating thrust constants of coils in the rotary apparatus according to the first embodiment of the present invention.
Figure 5A:
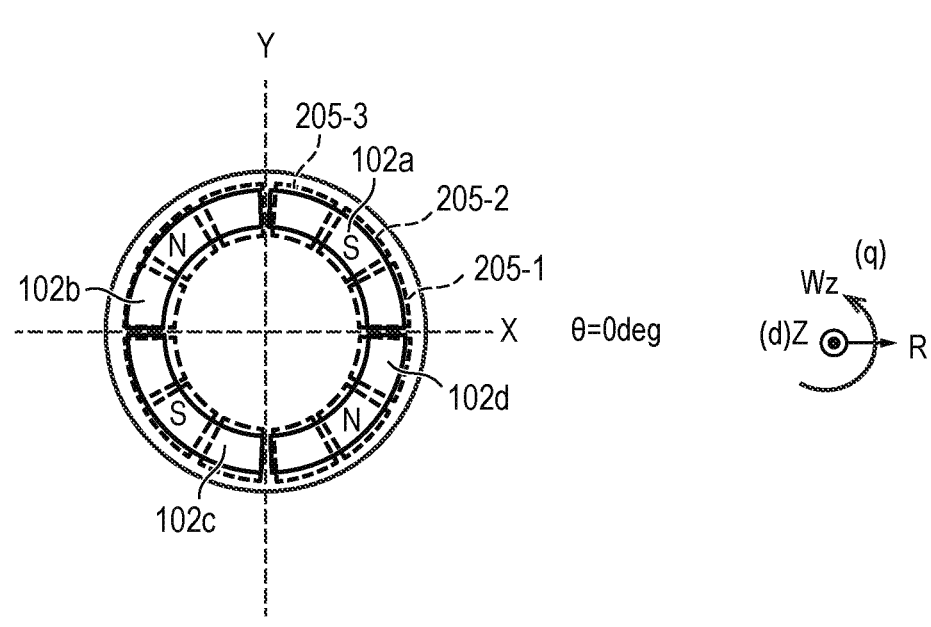
FIG. 5A is a schematic diagram illustrating a method of applying torque to the mover in the rotary apparatus according to the first embodiment of the present invention.
Figure 5B:
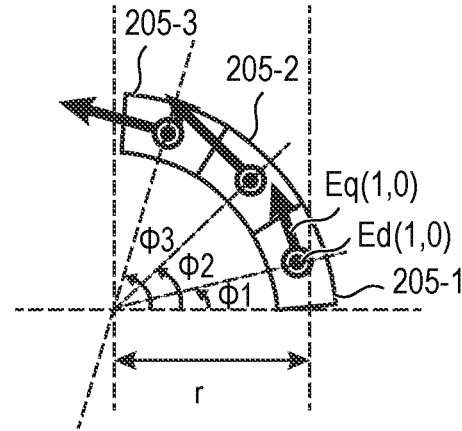
FIG. 5B is a schematic diagram illustrating a method of applying torque to the mover in the rotary apparatus according to the first embodiment of the present invention.

Hereinafter, a method of applying the torque vector T to the mover 101 by the coils 205 under the control of the control unit 30 will be further described with reference to FIG. 4 to FIG. 5B. FIG. 4 is a graph schematically illustrating the thrust constants of the coils 205. FIG. 5A and FIG. 5B are schematic diagrams illustrating the method of applying the torque to the mover 101.

FIG. 5A illustrates a state of the mover 101 when the rotation angle $\theta=0$. In this case, the permanent magnet 102a is located below the coils 205-1, 205-2 and 205-3.

FIG. 4 illustrates the magnitude of the torque in the q-axis direction and the d-axis direction per unit current of the coil 205, that is, the thrust constants, when the mover 101 is in the rotation angle $\theta=0$. The q-axis and the d-axis indicated here correspond to the q-axis and d-axis in the motor control theory, respectively. In FIG. 5A, the q-axis direction corresponds to the Wz direction and the d-axis direction corresponds to the Z direction.

Furthermore, in FIG. 4, Eq is a thrust constant in the q-axis direction and Ed is a thrust constant in the d-axis direction. Each of Eq and Ed differs depending on the rotation angle $\theta$ of the mover 101 and the index j of the coil 205. In Eq and Ed, the first argument represents the index j (1 to 12) of the coil 205, and the second argument represents the rotation angle $\theta$ of the mover 101. Eq and Ed can be expressed as Eq(j, $\theta$) and Ed(j, $\theta$) using the index j and the rotation angle $\theta$, respectively.

For example, when the rotation angle $\theta$ is 0, for the coil 205-1, there is the permanent magnet 102a facing the S pole toward the coil 205-1 side at a position facing the coil 205-1 in the Z direction, and there is the permanent magnet 102d facing the N pole toward the coil 205-1 side in the −Wz direction. As a result, if a unit current is applied to the coil 205-1 so that the S pole appears on the surface of the coil 205-1 on the mover 101 side, force for rotating the mover 101 in the +Wz direction and force for pushing down the mover 101 in the −Z direction are generated. Therefore, when the unit current is applied in this manner, Eq(1,0) becomes a positive value and Ed(1,0) becomes a negative value.

FIG. 4 is a graph schematically illustrating the thrust constants of each of coils 205 plotted as described above. Furthermore, FIG. 5B schematically illustrates the coils 205-j and the magnitude of the force applied to the permanent magnet 102 as a reaction of their thrust constants.

The magnitude of the force acting between the coil 205-j and the mover 101 is given by the following Equations (2-1) and (2-2), respectively, where the force acting in the Wz direction is Fwz and the force acting in the Z direction is Fz. Here, Ij is a current value applied to the coil 205-j and is an element of the current vector I. In addition, * is a multiplication symbol.

$$Fwz=Eq(j,\theta)*Ii \qquad \text{Equation (2-1)}$$

$$Fz=Ed(j,\theta)*Ij \qquad \text{Equation (2-2)}$$

Therefore, for the entire twelve coils 205, if the angle of the coil 205-j is $\phi j$ and the distance between the rotation axis of the mover 101 and the coil 205-j is r, the respective components of the torque vector T are calculated by the following Equations (3-1) to (3-6). Note that the symbol $\Sigma$ is defined as the sum for j=1 to 12.

$$Tx=-\Sigma Eq(j,\theta)*Ij*\sin\phi j \qquad \text{Equation (3-1)}$$

$$Ty=\Sigma Eq(j,\theta)*Ij*\cos\phi j \qquad \text{Equation (3-2)}$$

$$Tz=\Sigma Ed(j,\theta)*Ij \qquad \text{Equation (3-3)}$$

$$Twx=r*\Sigma Ed(j,\theta)*Ij*\sin\phi j \qquad \text{Equation (3-4)}$$

$$Twy=r*\Sigma Ed(j,\theta)*Ij*\cos\phi j \qquad \text{Equation (3-5)}$$

$$Twz=r*\Sigma Eq(j,\theta)*Ij \qquad \text{Equation (3-6)}$$

In the control unit 30, the coil controller 302 can calculate a current vector having a current value Ij satisfying a desired torque vector T calculated by the attitude controller 301 as an element and apply it to each coil 205-j.

Since there are innumerable combinations of current values Ij, which are elements of the current vector I that satisfies Equations (3-1) to (3-6), they can be calculated by various calculation methods. Hereinafter, an example of a calculation method of a combination of current values Ij of the current vector I, which can be used in the coil controller 302, will be described.

Here, symbols are defined and summarized again, which include the symbols used above.

j: index for identifying the coil 205 (1 to 12)

$\phi j$: angle of j-th coil 205-j

$\theta$: rotation angle

Eq(j, $\theta$): force per unit current in the q-axis direction acting between the j-th coil 205-j and the mover 101 of the rotation angle $\theta$ Ed(j, $\theta$): force per unit current in the d-axis direction acting between the j-th coil 205-j and the mover 101 of the rotation angle $\theta$ i: index for indicating the component of the torque vector T (1 to 6, 1: the X direction, 2: the Y direction, 3: the Z direction, 4: the Wx direction, 5: the Wy direction, 6: the Wz direction)

I: current vector which is a column vector with twelve elements

Ij: element of current vector I

K: fundamental current vector which is a column vector with six elements

Ki: element of the fundamental current vector K

M: matrix with elements in i rows and j columns

Inv: symbol of inverse matrix

Transpose: symbol of transpose matrix

*: multiplication symbol for matrix and scalar elements

Furthermore, the elements Mij of the matrix M are defined by row vectors M1 to M6 represented by the following Equations (4-1) to (4-6). Here, Mi=(Mi1, Mi2, . . . , Mi12).

$$M1=\{Eq(1,\theta)*\sin\phi1,Eq(2,\theta)*\sin\phi2,\ldots,Eq(12,\theta)*\sin\phi12\} \qquad \text{Equation (4-1)}$$

$$M2=\{Eq(1,\theta)*\cos\phi1,Eq(2,\theta)*\cos\phi2,\ldots,Eq(12,\theta)*\cos\phi12\} \qquad \text{Equation (4-2)}$$

$$M3=\{Ed(1,\theta),Ed(2,\theta),\ldots,Ed(12,\theta)\} \qquad \text{Equation (4-3)}$$

$$M4=\{r*Ed(1,\theta)*\sin\phi1,r*Ed(2,\theta)*\sin\phi2,\ldots,r*Ed(12,\theta)*\sin\phi12\} \qquad \text{Equation (4-4)}$$

$$M5=\{r*Ed(1,\theta)*\cos\phi1,r*Ed(2,\theta)*\cos\phi2,\ldots,r*Ed(12,\theta)*\cos\phi12\} \qquad \text{Equation (4-5)}$$

$$M6=\{r*Eq(1,\theta),r*Eq(2,\theta),\ldots,r*Eq(12,\theta)\} \qquad \text{Equation (4-6)}$$

The torque vector T whose respective components are represented by the Equations (3-1) to (3-6) can be represented by the following Equation (5-1) using the matrix M whose respective matrix elements are represented by the Equations (4-1) to (4-6).

$$T=M*I \qquad \text{Equation (5-1)}$$

Furthermore, a fundamental current vector K, which is a column vector having six elements Ki, is defined, and a matrix Transpose(M) is used as the transpose matrix of the matrix M. Then, the current vector I can be expressed by the following equation (5-2) based on the amount of current applied to each coil 205 and the contribution ratio of the amount of current to the torque vector T.

$$I=\text{Transpose}(M)*K \qquad \text{Equation (5-2)}$$

Then, the Equation (5-1) can be transformed into the following Equation (5-3) using the Equation (5-2).

$$T=M*I=M*\text{Transpose}(M)*K \qquad \text{Equation (5-3)}$$

Furthermore, the Equation (5-3) can be modified as the following Equation (5-4).

$$\text{Inv}(M*\text{Transpose}(M))*T=K \qquad \text{Equation (5-4)}$$

Thus, the current vector I can be determined finally by the following Equation (5-5).

$$I=\text{Transpose}(M)*K=\text{Transpose}(M)*\text{Inv}(M*\text{Transpose}(M))*T \qquad \text{Equation (5-5)}$$

In the Equation (5-5), since M*Transpose(M) is a square symmetric matrix, its inverse matrix Inv(M*Transpose(M)) can always be calculated. Thus, the set of each element Ij of the current vector I can be determined uniquely by the Equation (5-5). The coil controller 302 can calculate the combination of the current values Ij of the current vector I as described above and apply a current of the current value Ij to each coil 205-j.

Thus, in the present embodiment, it is possible to apply torques of six independent axes to the mover 101. Therefore, in the present embodiment, the mover 101 is floated from the stator 201, and the rotational speed and attitude of the mover 101 can be more stably controlled without contact.

Furthermore, in the present embodiment, by controlling the current applied to the coils 205 of the stator 201, where the force acts with the permanent magnet 102 of the mover 101, it is possible to control the rotational speed and attitude of the mover 101 while making the mover 101 floated. As described above, in the present embodiment, since the permanent magnets 102 and the coils 205 are used both for controlling the rotation of the mover 101 and for controlling the attitude, the structure of the pump 10 including the motor 20 can be made simpler.

As described above, according to the present embodiment, the mover 101 can be rotated more stably without contact by a simpler structure.

Note that, as described above, a cored coil or an air core coil is used as the coil 205 of the stator 201. When the coil 205 is a cored coil, an attractive force always acts between the coil 205 and the permanent magnet 102 regardless of whether a current is applied to the coil 205.

Therefore, when the coil 205 is a cored coil, for example, gravity always acts on the mover 101 when the Z direction in FIG. 1A is in a vertical direction, but all or part of the gravity can be canceled by the attractive force. Therefore, in this case, the torque applied to the coil 205 in the Z direction can be reduced. Therefore, since the current value applied to the coil 205 can be reduced, the amount of heat generated in the coil 205 can be reduced.

Second Embodiment

Figure 6:
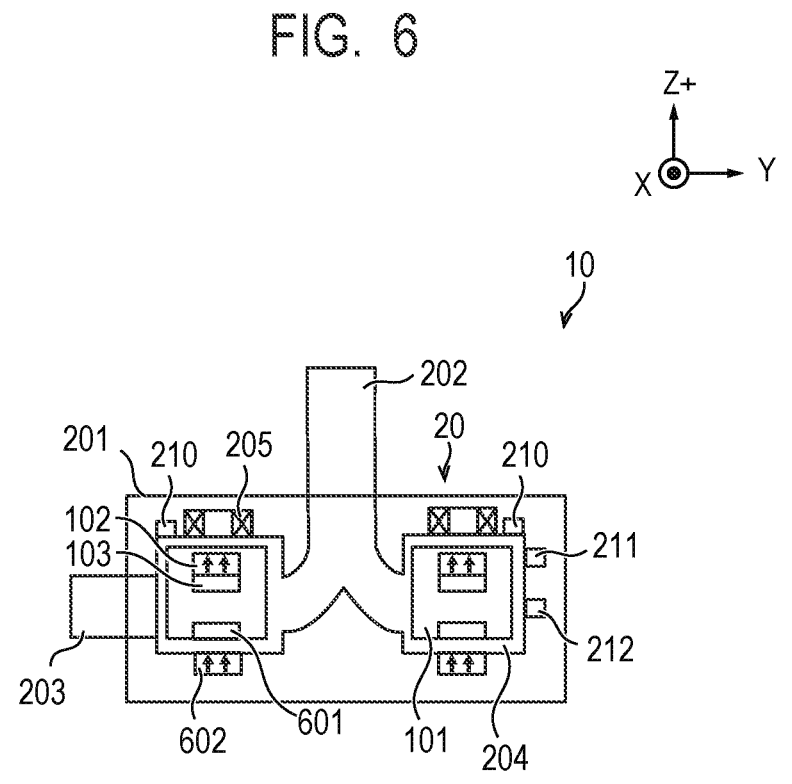

A second embodiment of the present invention will be described with reference to FIG. 6. FIG. 6 is a schematic diagram illustrating a pump 10 according to the present embodiment. Note that the same components as those in the above first embodiment are labeled with the same references, and the description thereof will be omitted or simplified.

The basic configuration of the pump 10 according to the present embodiment is substantially the same as that of the first embodiment. The pump 10 according to the present embodiment further includes a configuration for further stabilizing the attitude of the mover 101 in addition to the configuration according to the first embodiment.

As illustrated in FIG. 6, the pump 10 according to the present embodiment includes a soft magnetic member 601 and a permanent magnet 602 as the configuration for stabilizing the attitude of the mover 101 in the Z direction. The soft magnetic member 601 is installed on the mover 101. The permanent magnet 602 is installed in the stator 201. The soft magnetic member 601 and the permanent magnet 602 function as a first attraction portion and a second attraction portion, respectively, in which attraction force acts on each other.

The plurality of permanent magnets 102 and the plurality of coils 205 face each other on the side of the upper end portion which is one end of the rotating mover 101 in the Z direction along the rotation axis of the mover 101. On the other hand, the soft magnetic member 601 and the permanent magnet 602 face each other on the side of the lower end portion which is the other end of the rotating mover 101 in the Z direction along the rotation axis of the mover 101.

The soft magnetic member 601 is attached to the lower portion of the mover 101 so as to be positioned on the opposite side of the surface of the permanent magnet 102 facing the coil 205 in the Z direction. The soft magnetic member 601 is made of a soft magnetic material, and is a member which can be attracted by the permanent magnet 602 by attraction force acting between the soft magnetic member 601 and the permanent magnet 602. The soft magnetic member 601 is made of, for example, iron, which is a material having a large magnetic permeability.

On the other hand, the permanent magnet 602 is disposed in the stator 201 at a position facing the soft magnetic member 601.

In the present embodiment, attractive force acts in the Z direction between the soft magnetic member 601 and the permanent magnet 602, which are arranged as described above. By such attractive force, force for attracting the mover 101 acts in the Z direction even when the Z direction is not a vertical direction. Therefore, according to the present embodiment, the attitude of the mover 101 can be further stabilized.

Note that, in the above description, the soft magnetic member 601 is provided on the mover 101, and the permanent magnet 602 is provided on the stator 201, but the present invention is not limited thereto. For example, the soft magnetic member 601 and the permanent magnet 602 may be interchanged to be installed in the mover 101 and the stator 201. That is, the mover 101 may be provided with the permanent magnet 602 as the first attraction portion, and the stator 201 may be provided with the soft magnetic member 601 as the second attraction portion.

A coil may be provided as the first attraction portion in place of the soft magnetic member 601 provided on either the mover 101 or the stator 201. In this case, a current is applied to the coil so that attractive force is applied between the coil and the permanent magnet 602 as the second attraction, which is installed on the other of the mover 101 and the stator 201.

Third Embodiment

Figure 7:
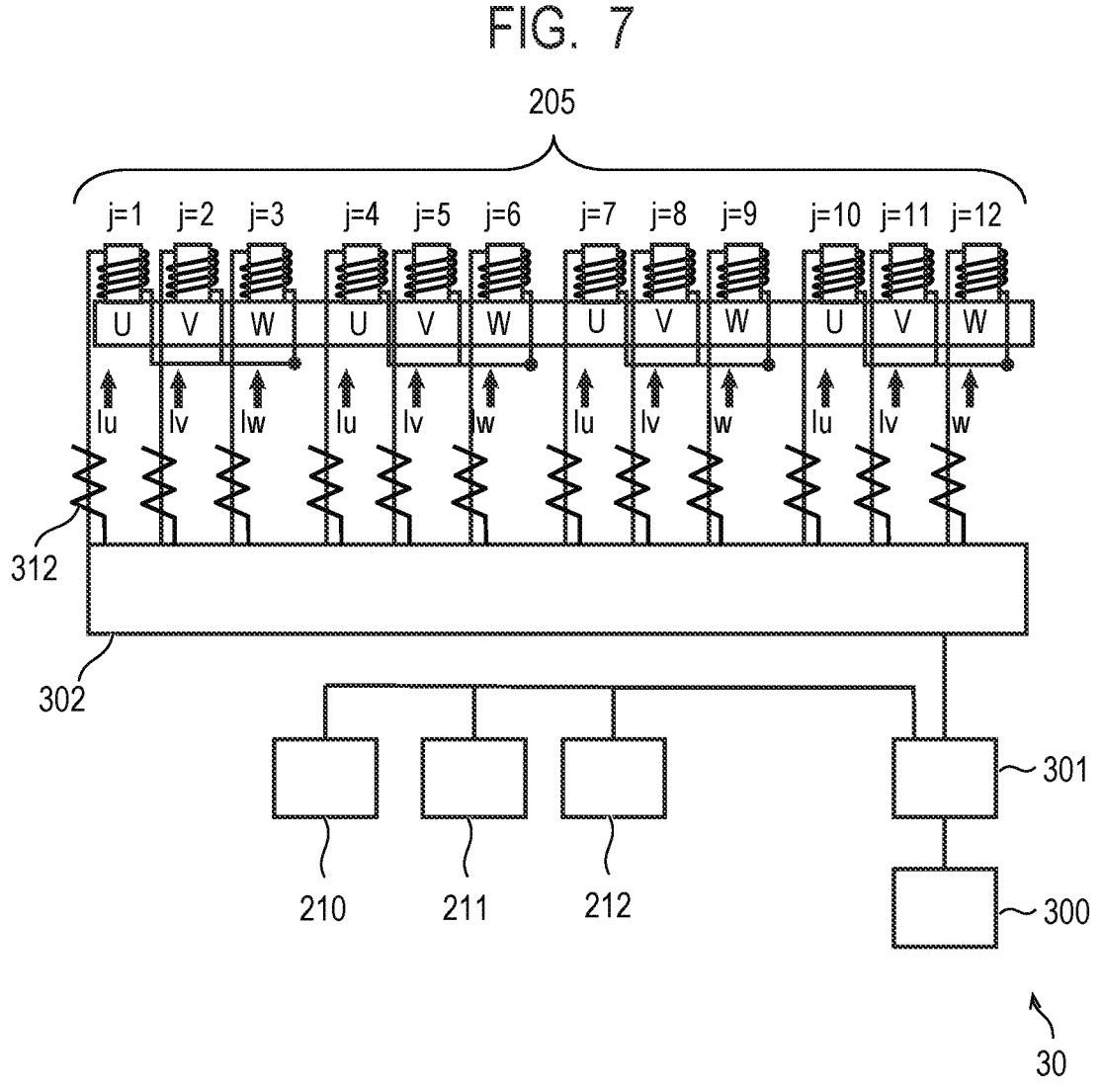
FIG. 7 is a schematic diagram illustrating a control unit of a rotary apparatus according to a third embodiment of the present invention.

A third embodiment of the present invention will be described with reference to FIG. 7. FIG. 7 is a schematic diagram illustrating the configuration of the control unit 30 of the pump 10 according to the present embodiment. Note that the same components as those in the above first and second embodiments are labeled with the same references, and the description thereof will be omitted or simplified.

The basic configuration of the pump 10 according to the present embodiment is substantially the same as that of the first embodiment. In the pump 10 according to the present embodiment, the connection of the plurality of coils 205 is changed in the configuration according to the first embodiment.

As illustrated in FIG. 7, in the present embodiment, the coils 205 are connected three by three by star connection. That is, in the twelve coils 205, each set of the coils 205-1 to 205-3, the coils 205-4 to 205-6, the coils 205-7 to 205-9, and the coils 205-10 to 205-12 are connected by star connection. Each of the three coils 205 connected by the star connection constitutes a three-phase coil. Thus, in the present embodiment, the plurality of coils 205 are composed of four three-phase coils.

When the coils are connected by the star connection as in the present embodiment, four conditions represented by the following Equations (6-1) to (6-4) are added as to the current value Ij of each coil 205-*j*.

$$I1+I2+I3=0 \qquad \text{Equation (6-1)}$$

$$I4+I5+I6=0 \qquad \text{Equation (6-2)}$$

$$I7+I8+I9=0 \qquad \text{Equation (6-3)}$$

$$I10+I11+I12=0 \qquad \text{Equation (6-4)}$$

At this time, it is possible to add a condition under which the around-X-axis component Twx and the around-Z-axis component Twz of the torque are equally divided by the coils 205-1 to 205-6 and the coils 205-7 to 205-12, respectively.

The condition under which the around-X-axis component Twx is equally divided by the coils 205-1 to 205-6 and the coils 205-7 to 205-12 is expressed by the following Equation (6-5).

$$\Sigma(j=1,2,3,4,5,6)Ed(j,\theta)*Ij*\sin \phi j=\Sigma(j=7,8,9,10,11,12)$$
$$Ed(j,\theta)*Ij*\sin \phi j \qquad \text{Equation (6-5)}$$

Furthermore, the condition under which the around-Z-axis component Twz is equally divided by the coils 205-1 to 205-6 and the coils 205-7 to 205-12 is expressed by the following Equation (6-6).

$$\Sigma(j=1,2,3,4,5,6)Ep(j,\theta)*Ij=\Sigma(j=7,8,9,10,11,12)Ep(j,\theta)$$
$$*Ij \qquad \text{Equation (6-6)}$$

Note that, in the Equations (6-5) and (6-6), the symbol Σ does not mean the sum for all of j=1 to 12, but the sum for the set of j indicated in parentheses to the right side of the symbol Σ.

Since twelve conditions are obtained by combining the Equations (6-1) to (6-6) thus obtained and the Equations (3-1) to (3-6), the current values Ij, which is the twelve elements of the current vector I, can be determined. The control unit 30 including the attitude controller 301 and the coil controller 302 can determine the current values Ij using these twelve conditions and apply it to each coil 205-*j*.

The wiring of the coil 205 can be simplified by making the plurality of coils 205 constituted of the four three-phase coils to be operated as in the present embodiment. Therefore, in the present embodiment, the configuration of the motor 20 and the pump 10 including the motor 20 can be further simplified.

Note that, in the above description, the case where the star connection is adopted for the coils 205 in the configuration according to the first embodiment is described, but the present invention is not limited thereto. In the configuration according to the second embodiment also, star connection can be adopted for the coil 205 as in the present embodiment.

Modification Embodiment

The present invention is not limited to the embodiments described above, and various modifications are possible.

For example, in the above embodiments, the cases where the plurality of permanent magnets 102 are installed in the mover 101 and the plurality of coils 205 are installed in the stator 201 have been described as examples, but the present invention is not limited thereto. The plurality of permanent magnets 102 and the plurality of coils 205 may be interchanged to be installed in the mover 101 that is the first portion and the stator 201 that is the second portion. That is, the plurality of coils 205 may be installed in the mover 101, and the plurality of permanent magnets 102 may be installed in the stator 201.

Furthermore, in the above embodiments, the pump 10 has been described as an example of the rotary apparatus in which the motor 20 is used, but the present invention is not limited to this. In addition to the pump 10, a high-speed rotating machine, a high-speed spindle for a machine tool, an artificial heart, and the like can be configured as the rotary apparatus using the motor 20. A rotating member rotating together with the mover 101 can be constituted in accordance with the rotary apparatus.

According to the present invention, the mover can be rotated more stably without contact by a simpler structure.

The present invention is not limited to the embodiments described above, and various modifications and variations are possible without departing from the spirit and scope of the present invention. Accordingly, in order to make the scope of the present invention public, the following claims are attached.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A motor comprising:
   a first portion that includes a plurality of permanent magnets;
   a second portion that includes a plurality of coils, wherein the first portion or the second portion is configured to be rotatable around a rotation axis; and
   a control circuit that controls a rotational speed and an attitude of the first portion when it rotates or the second portion when it rotates, by controlling currents that are applied to the plurality of coils, wherein the plurality of permanent magnets are circumferentially arranged about the rotation axis, wherein the plurality of coils are arranged so as to face the plurality of permanent magnets in a direction along the rotation axis, wherein the plurality of coils are arranged so that the plurality of coils do not overlap each other in the circumferential direction and at least three coils among the plurality of coils circumferentially overlap with each of the plurality of permanent magnets, viewed in the direction along the rotation axis, and wherein the control circuit independently controls a current value of each of the plurality of coils.

2. The motor according to claim 1, wherein the coils are cored coils.

3. The motor according to claim 1, comprising:

a first attraction portion that is installed in the first portion; and a second attraction portion that is installed in the second portion, attractive force acting between the first attraction portion and the second attraction portion, wherein the plurality of permanent magnets and the plurality of coils face each other on a side of one end of the rotating first portion or the rotating second portion in the direction along the rotation axis, and wherein the first attraction portion and the second attraction portion face each other on a side of the other end of the rotating first portion or the rotating second portion in the direction along the rotation axis.

4. The motor according to claim 3, wherein the first attraction portion is a soft magnetic member or a coil, and wherein the second attraction portion is a permanent magnet.

5. The motor according to claim 3, wherein the first attraction portion is a permanent magnet, and wherein the second attraction portion is a soft magnetic member or a coil.

6. The motor according to claim 1, wherein the plurality of coils are composed of three-phase coils.

7. The motor according to claim 1, wherein the first portion is a mover that is rotatable with the rotation axis as a center.

8. An apparatus comprising:

the motor according to claim 1; and a rotary member that rotates together with the first portion when it rotates or the second portion when it rotates.

9. The apparatus according to claim 8, wherein the first portion when it rotates or the second portion when it rotates is accommodated in a pump chamber, and wherein the rotary member is a fin.

10. The motor according to claim 1, wherein the number of coils is at least three times the number of permanent magnets.

11. A motor comprising:

a first portion that includes a plurality of permanent magnets;

a second portion that includes a plurality of coils, wherein the first portion or the second portion is configured to be rotatable around a rotation axis; and a control circuit that controls a rotational speed and an attitude of the first portion when it rotates or the second portion when it rotates, by controlling currents that are applied to the plurality of coils, wherein the plurality of permanent magnets are circumferentially arranged about the rotation axis, wherein the plurality of coils are arranged so as to face the plurality of permanent magnets in a direction along the rotation axis, wherein the plurality of coils are arranged so that the plurality of coils do not overlap each other in the circumferential direction and at least three coils among the plurality of coils circumferentially overlap with each of the plurality of permanent magnets, viewed in the direction along the rotation axis, and wherein each coil is provided with an individual current sensor.

12. The motor according to claim 11, wherein the coils are cored coils.

13. The motor according to claim 11, comprising:

a first attraction portion that is installed in the first portion; and a second attraction portion that is installed in the second portion, attractive force acting between the first attraction portion and the second attraction portion, wherein the plurality of permanent magnets and the plurality of coils face each other on a side of one end of the rotating first portion or the rotating second portion in the direction along the rotation axis, and wherein the first attraction portion and the second attraction portion face each other on a side of the other end of the rotating first portion or the rotating second portion in the direction along the rotation axis.

14. The motor according to claim 13, wherein the first attraction portion is a soft magnetic member or a coil, and wherein the second attraction portion is a permanent magnet.

15. The motor according to claim 13, wherein the first attraction portion is a permanent magnet, and wherein the second attraction portion is a soft magnetic member or a coil.

16. The motor according to claim 11, wherein the plurality of coils are composed of three-phase coils.

17. The motor according to claim 11, wherein the first portion is a mover that is rotatable with the rotation axis as a center.

18. An apparatus comprising:

the motor according to claim 11; and a rotary member that rotates together with the first portion when it rotates or the second portion when it rotates.

19. The apparatus according to claim 18, wherein the first portion when it rotates or the second portion when it rotates is accommodated in a pump chamber, and wherein the rotary member is a fin.

20. The motor according to claim 11, wherein the number of coils is at least three times the number of permanent magnets.

* * * * *